(12) United States Patent
Fletcher et al.

(10) Patent No.: US 8,417,764 B2
(45) Date of Patent: Apr. 9, 2013

(54) DYNAMIC MASHUP CREATION FROM A SET OF RESOURCES AND RESOURCE RELATIONSHIPS

(75) Inventors: James C. Fletcher, Apex, NC (US); Kimberly D. Kenna, Cary, NC (US); Wayne B. Riley, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 409 days.

(21) Appl. No.: 12/032,912

(22) Filed: Feb. 18, 2008

(65) Prior Publication Data

US 2009/0210481 A1    Aug. 20, 2009

(51) Int. Cl.
*G06F 15/16* (2006.01)
*G06F 3/048* (2006.01)
*G06F 9/44* (2006.01)

(52) U.S. Cl. ......... 709/203; 715/769; 715/855; 717/107

(58) Field of Classification Search ................ 709/203
See application file for complete search history.

(56) References Cited

U.S. PATENT DOCUMENTS

| 2004/0015476 A1* | 1/2004 | Twaddle | 707/1 |
| 2008/0155440 A1* | 6/2008 | Trevor et al. | 715/769 |
| 2008/0222572 A1* | 9/2008 | Nathan et al. | 715/855 |

* cited by examiner

*Primary Examiner* — Ashok Patel
*Assistant Examiner* — Evans Desrosiers
(74) *Attorney, Agent, or Firm* — Patents on Demand P.A.; Brian K. Buchheit; Scott M. Garrett

(57) ABSTRACT

A dependency hierarchy of resources can be determined for a dynamic mashup. The dependency hierarchy can specify dependency relationships among a set of resources. A set of views that correspond to the set of resources can be ascertained. For each view, a view template can be determined that is to be applied to that view. The mashup can be dynamically created that includes the views, each of which is configured in accordance with the associated view template. The created mashup can also include content defined by the set of resources that is configured in a manner consistent with the dependency relationships of the dependency hierarchy.

20 Claims, 4 Drawing Sheets

100

DYNAMIC MASHUP CREATION FROM A SET OF RESOURCES AND RESOURCE RELATIONSHIPS

BACKGROUND OF THE INVENTION

The present invention relates to the field of Web 2.0 technologies and, more particularly, to dynamic mashup creation from a set of resources and resource relationships.

Commonly, web applications allow users to customize their view by selecting which information is to be displayed and where. Some applications allow a user to even create new content and display it on their custom "mashup" page. These web applications save the user's configuration of their mashup, so the user can view the same content when they return. Mashups are used in many different situations. For example, a user can create a mashup to use as a central location to check content when they sign online. Mashups can also be used to generate custom views to create a presentation, or manage services or applications. For example, a service manager can create a custom mashup to view different aspects of the service and manage it accordingly.

As more content is created, or content is changed, existing mashups can become incorrect or outdated. In the example when a mashup is used to manage a service or application, the service or application can change over time, and the mashup would be required to be updated accordingly. Also, as more content is created, storage for the content, and each mashup configuration, can become cumbersome.

BRIEF SUMMARY OF THE INVENTION

One aspect of the present invention can include a method, system, apparatus, and computer program product for dynamic mashup creation. The invention can identify request for a dynamic mashup. A dependency hierarchy of resources can be determined for the dynamic mashup. The dependency hierarchy can specify dependency relationships among a set of resources. A set of views that correspond to the set of resources can be ascertained. For each view, a view template can be determined that is to be applied to that view. The mashup can be dynamically created that includes the views, each of which is configured in accordance with the associated view template. The created mashup can also include content defined by the set of resources that is configured in a manner consistent with the dependency relationships of the dependency hierarchy.

Another aspect of the present invention can include system for creating dynamic mashups. The system can include a data store, a request processing component, a dynamic mashup creation engine, and a serving component. The data store can be used to store and maintain information for a set of resources and resource relationships. Each of the resources can be associated with at least one Uniform Resource Identifier (URI) that identifies a source of content for the associated resource. The resource relationships can define dependencies among resources. A set of user and administrator configurable resource groupings can also be included in the data store. Each resource grouping can define content to be used to generate a corresponding mashup. The request processing component can receive requests for mashups from remotely located computing devices over a network. The dynamic mashup creation engine can dynamically create mashups given a resource grouping, eliminating the need to manually maintain mashup pages. Content of the dynamically created mashups can include content defined by the resources and the resource relationships associated with the given resource grouping. The serving component can serve dynamically created mashups generated by the dynamic mashup creation engine to request issuing computing devices in response to requests received from the request processing component.

DETAILED DESCRIPTION OF THE INVENTION

Figure 1:
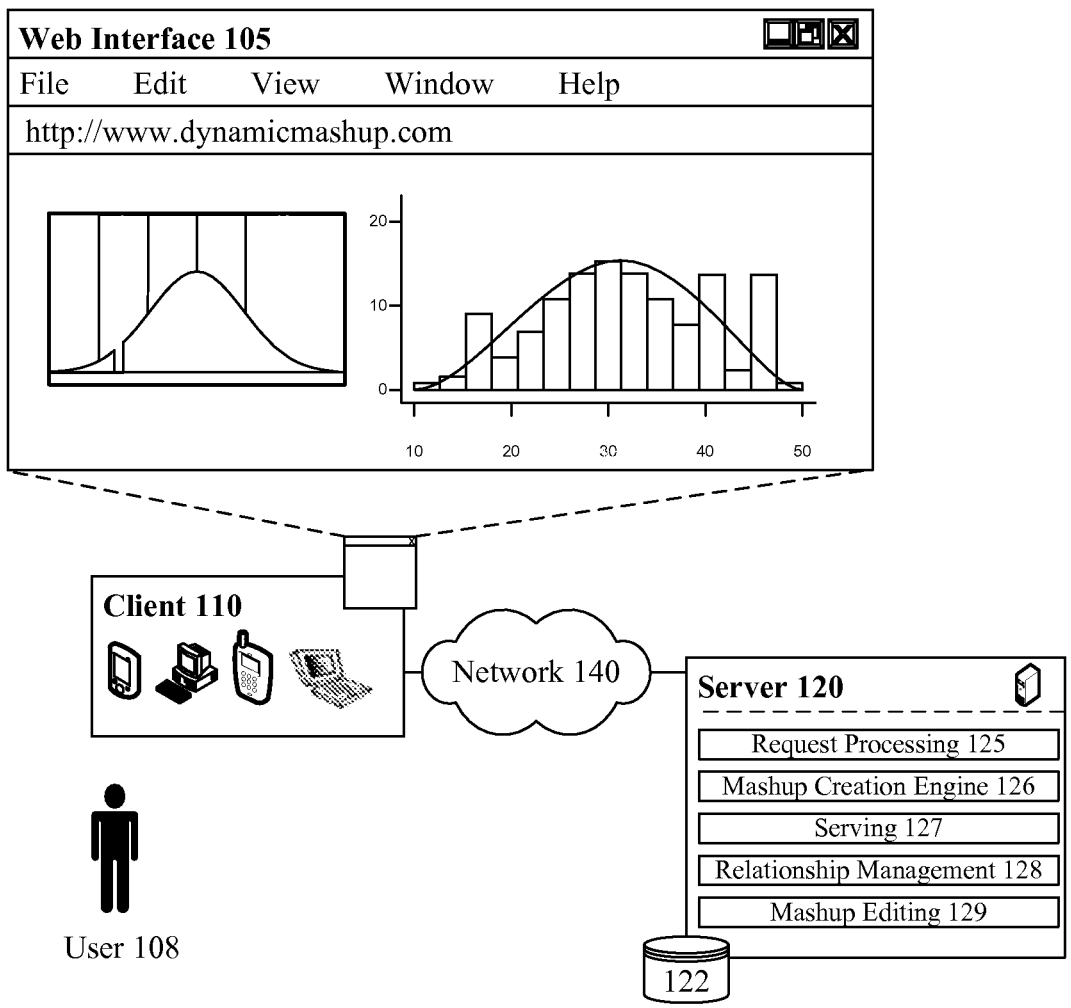
FIG. 1 is a schematic diagram of a system for using related information to dynamically generate a mashup in accordance with an embodiment of the inventive arrangements disclosed herein.

The present invention can allow for a mashup to be generated dynamically when the page is loaded. The mashup can be generated dynamically by using information stored in a relational database. First, a service can be determined in which a user wants to view. A service can be a topic of content, a running service or application, or the like. The construction of the mashup can begin by locating the service or application to be viewed in the relational database. Once the service or application has been located, related information, or resources, can be determined. Information can be related in many ways. For example, the service or application can directly depend on another resource to function properly. However, the depended on resource can also depend on other resources, which can allow these resources to relate to the service or application. Logic can be applied to determine which resources to be shown in each view. Once a collection of related resources can be found, the view can be rendered on screen. Because the mashup is dynamically generated, the view is not required to be stored and the view can always contain current and correct information.

Another aspect of the current invention can allow for a user's role to be considered when determining relative information to be displayed on a dynamically generated mashup. For example, if a user requesting the mashup is a performance analyst, the views can be configured with performance metrics as the view is generated. In another example, if the user is a business manager, the views can be configured to display key performance indicator (KPI) metrics, again as the view is generated.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. Examples of a computer-readable medium include a semiconductor or solid state memory, magnetic tape, a removable computer diskette, a random access memory (RAM), a read-only memory (ROM), an erasable programmable read-only memory (EPROM or Flash memory, a rigid magnetic disk and an optical disk. Current examples of optical disks include compact disk—read only memory (CD-ROM), compact disk—read/write (CD-R/W) and DVD. Other computer-readable medium can include a transmission media, such as those supporting the Internet, an intranet, a personal area network (PAN), or a magnetic storage device. Transmission media can include an electrical connection having one or more wires, an optical fiber, an optical storage device, and a defined segment of the electromagnet spectrum through which digitally encoded content is wirelessly conveyed using a carrier wave.

Note that the computer-usable or computer-readable medium can even include paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a schematic diagram of a system 100 for using related information to dynamically generate a mashup in accordance with an embodiment of the inventive arrangements disclosed herein. In system 100, a user 108 of client 110 can convey a request for a mashup over network 140 to server 120. The server 120 can dynamically generate a mashup for the request, which can be conveyed back over network 140 and displayed within a Web interface 105. The dynamically generated page can be constructed based upon a set of resources and their relationships to one another. In one embodiment, a data presentation and content can be bifurcated, where the resources specify the content and data presentation is determined based upon information specified within view specific templates. That is, the resources function as an anchor for starting view construction for the mashup. A context formed by a set of resources, a user 108 identity, a user 108 role, and other definable characteristics can change details of how a set of views are constructed given a set of resources. In one embodiment, user 108 can configure/edit the resources and the view details of the mashup that is dynamically created.

Information used by server 120 to dynamically create a mashup can be stored in data store 122. Data store 122 can store entries for resource groupings, resources, resource relationships, user profiles, view templates, view construction rules, and the like. In one embodiment, each resource grouping can be expressed as a dependency hierarchy of resources. Additionally, each resource grouping can be associated with an executable service or application, which is able to generate a mashup dynamically using the resource grouping. The stored entries of the data store 122 can be associated with each other in a searchable fashion. Each resource can represent a portion of content to be included in a mashup. A resource relationship can define a set of dependencies among a set of resources. View templates can define presentation characteristics for views created from one or more resources.

Server 120 can include a request processing component 125, a mashup creation engine 126, a serving component 127, a relationship management component 128, a mashup editing component 129, and the like. The request processing component 125 can receive requests for mashups sent over network 140. The dynamic mashup creation engine 126 can dynamically create mashups given a resource grouping. Different contexts, users 108, user roles, view templates, and the like alter details of the dynamically created mashups. The serving component 127 can serve dynamically created mashups generated by the dynamic mashup creation engine 126 to request issuing computing devices, such as client 110.

The relationship management component 128 can detect changes made to the source of content for any of the resources of the data store, can determine changes to the resource relationships that result, and can update the resource relationships as needed. Thus, component 128 ensures the resource relationships and resource information stored in data store 122 remains current, even though the underlying content is subject to change. Since server 120 generates mashups dynamically, which means that out of date information is not persisted in the data store 122, a user 108 or administrator need not make manual changes to keep the mashups provided by server 120 current.

The mashup editing component 129 can provide an interface through which users, such as user 108, are able to select any of the resources contained within said data store and to define a new resource grouping based upon user selected resources. For example, a Web based mashup creation interface can be part of component 129. In one embodiment, the mashup editing component 129 can permit users to use relationship graphs to define a service (or relationship grouping), which in turn defines content for the mashup. Further, presentation specific settings, such as those specified in one or more view templates, can be linked to one or more resources from which mashup vies are dynamically generated. Mashups created and/or edited via component 129 can be published by server 120 to a set of one or more other users, depending upon publishing permissions and security restrictions imposed by a mashup creator, which can also be established/modified using component 129.

As used herein, a mashup can contain a mixture of content or elements that combines data from more than one resource (or source) into a single integrated product. Mashups permit an interpretation of one set of data from a first resource in a context of another set of data from a separate resource, where different results are generated based upon resource dependencies. For example, a mashup can graphically present a map of showing a set of addresses by interpreting addresses formatted grammatically in a first resource in a context of a second set of resources that interpret addresses as a set of map points on a visual map. A mashup can include a set of views, which are able to be overlaid, such as overlaying points of interest determined from one content source (e.g., a first resource) overtop of mapping data from a different content source (e.g., a second resource). Mashups are often considered a type of Web 2.0 object that is used to consolidate information from multiple sources into a single easy-to-use interface.

Client 110 can be any computing device capable of running a web client and communicating via network 140 with server 120. For example, client 110 can be any of a variety of devices including, but not limited to, a desktop computer, a laptop computer, a personal data assistant (PDA), a mobile phone, a laptop computer, and the like.

The network 140 can include any hardware/software/firmware necessary to convey digital content encoded within carrier waves. Content can be contained within analog or digital signals and conveyed through data or voice channels and can be conveyed over a personal area network (PAN) or a wide area network (WAN). The network 140 can include local components and data pathways necessary for communications to be exchanged among computing device components and between integrated device components and peripheral devices. The network 140 can also include network equipment, such as routers, data lines, hubs, and intermediary servers which together form a packet-based network, such as the Internet or an intranet. The network 140 can further include circuit-based communication components and mobile communication components, such as telephony switches, modems, cellular communication towers, and the like. The network 140 can include line based and/or wireless communication pathways.

As used herein, data store 122 can be physically implemented within any type of hardware including, but not limited to, a magnetic disk, an optical disk, a semiconductor memory, a digitally encoded plastic memory, a holographic memory, or any other recording medium. Data store 122 can be stand-alone storage units as well as a storage unit formed from a plurality of physical devices, which may be remotely located from one another. Additionally, information can be stored within the data store 122 in a variety of manners. For example, information can be stored within a database structure or can be stored within one or more files of a file storage system, where each file may or may not be indexed for information searching purposes.

Figure 2:
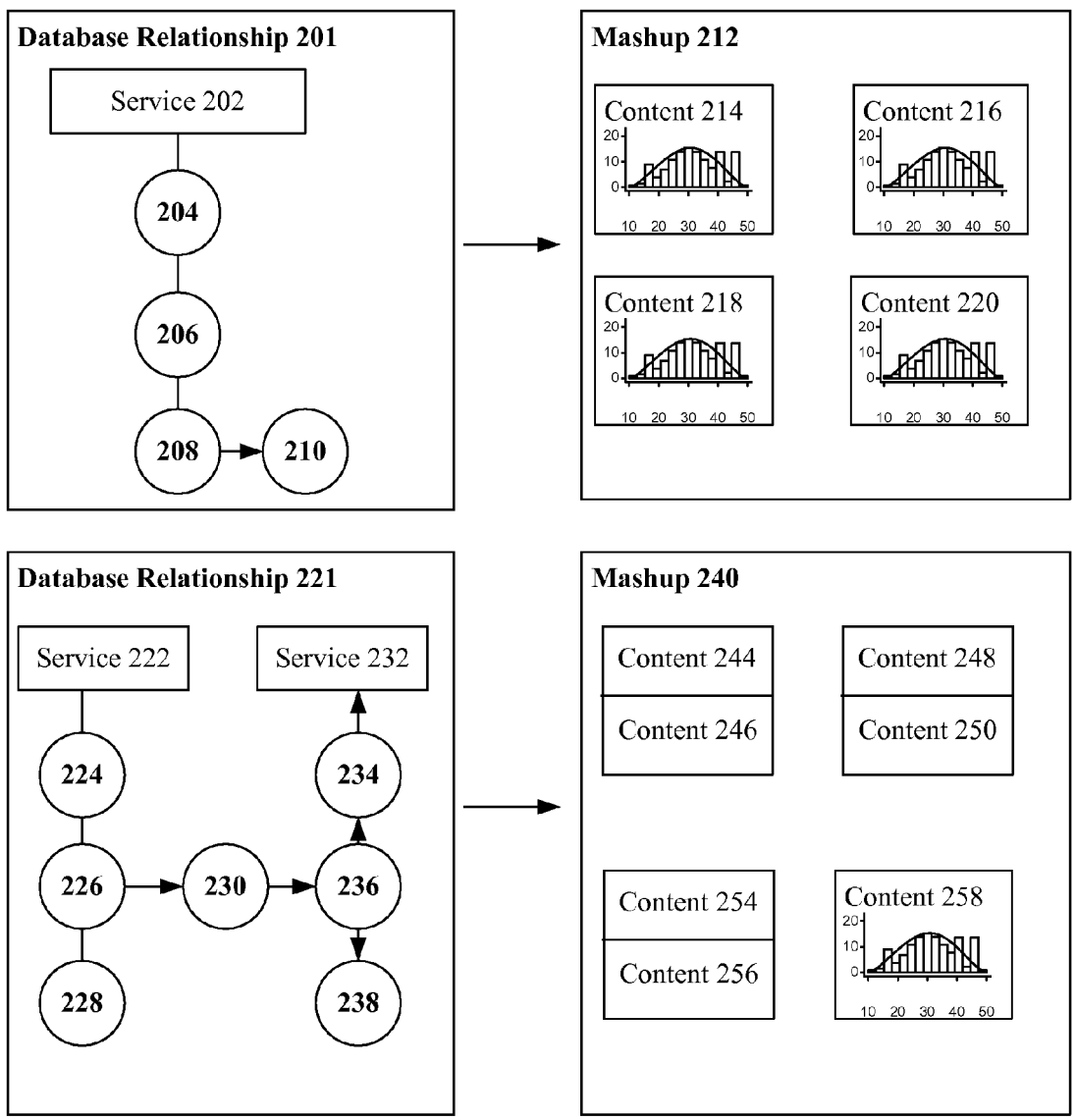
FIG. 2 is a schematic diagram of a system for using related information to dynamically generate a mashup in accordance with an embodiment of the inventive arrangements disclosed herein.

FIG. 2 is a schematic diagram of a system 200 for using related information to dynamically generate a mashup in accordance with an embodiment of the inventive arrangements disclosed herein. In system 200, database relationship 201 can show the relationship between content items and a service 202, 222, 232 (e.g., resource grouping) stored in a relational database. In one embodiment, the relationships 201 and 221 can represent relationships specified by a user 108 using a mashup editing component 129 to define a mashup that is to be dynamically generated. Other interfaces can be used to define mashups, mashup presentation characteristics, and the like and the invention is not to be construed as limited in this regard. Further the relationships 201, 221 can be specified within computer interpretable data files without utilizing a mashup editing component. For example, the relationships 201 can be defined within a set of database records using database commands.

Database relationship 201 can be used to create mashup 212. In database relationship 201, service 202 can depend on objects 204, 206, and 208. In database relationship 201, object 208 can also rely on object 210; therefore object 210 can be included to generate content in mashup 212. Object 204 can be used to generate content 214. Object 206 can be used to generate content 216. Object 208 can be used to generate content 218. Object 210 can be used to generate content 220.

Database relationship 221 can illustrate the relationship between content items and services stored in a relational database. In this example, service 222 can relate to objects 224, 226, and 228. Object 226 can depend on object 230, which can also depend on object 236. Object 236 can also depend on Objects 234 and 238. Object 234 can depend on service 232, which can cause mashup 240 to include multiple services. Object 224 and 226 can be used to create content 244 and content 246. Object 228 and 230 can be used to generate content 248 and content 250. Objects 234 and 236 can be used to generate content 254 and content 256. Object 238 can be used to generate content 258. Any changes to the relationships shown in relationship 201 or 221, such as object 208 no longer being dependent upon object 210, would be utilized to dynamically remove the content (content 220) from the mashup 212.

Database relationship 201 and 221 can be illustrative examples to show relationships between content objects stored in a relational database for use when generating dynamic mashups. Database relationship 201 can be used to generate mashup 212 and database relationship 221 can be used to generate mashup 240. These relational databases can be stored in a data store in context with data store 122 of system 100.

Figure 3:
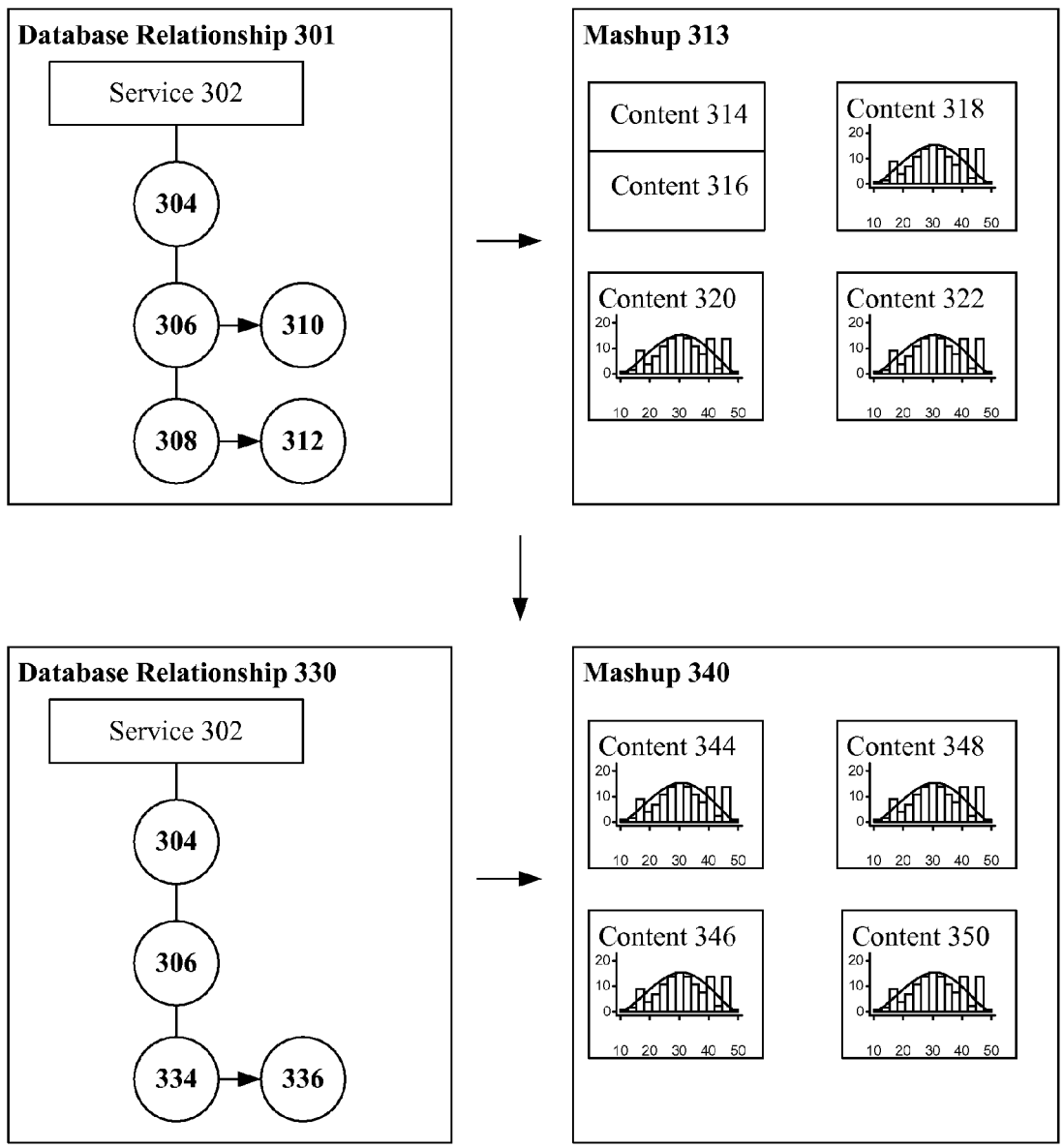
FIG. 3 is a schematic diagram of a system for using related information to dynamically generate a mashup in accordance with an embodiment of the inventive arrangements disclosed herein.

FIG. 3 is a schematic diagram of a system 300 for using related information to dynamically generate a mashup in accordance with an embodiment of the inventive arrangements disclosed herein. System 300 can be implemented in the context of a system 200. System 300 can illustrate how the dynamic generation of a mashup based on the same service can change.

In system 300, database relationships 301 and 330 can show the relationship between content objects and a service stored in a relational database. Database relationship 301 can be used to dynamically generate mashup 340. Database relationship 301 can show the relationship between service 302 and objects 304-312. Database relationship 330 can illustrate the same relationship after the database has changed. Database relationship 330 can show the relationship between service 302 and objects 304, 306, 334, and 336.

In database relationship 301, service 302 can depend on objects 304, 306, and 308. Object 306 can also depend on object 310 and object 308 can depend on object 312. In database relationship 330, the relationship between service 302 and content objects has changed from database relationship 301. Service 302 can still depend on objects 304 and 306, however it cannot depend on object 308. In database relationship 330, service 302 can also depend on object 334, which can also depend on object 336.

Mashup 313 can illustrate a dynamically generated mashup from database relationship 301. In mashup 313, content 314 and content 316 can be generated by objects 304 and 306. Content 318 can be generated by object 308. Content 320 can be generated by object 310. Content 322 can be generated by object 312.

Mashup 340 can illustrate a dynamically generated mashup from database relationship 330. In mashup 340, content 344 can be generated by object 304. Content 346 can be generated by object 306. Content 348 can be generated by object 334, and content 350 can be generated by object 336.

Figure 4:
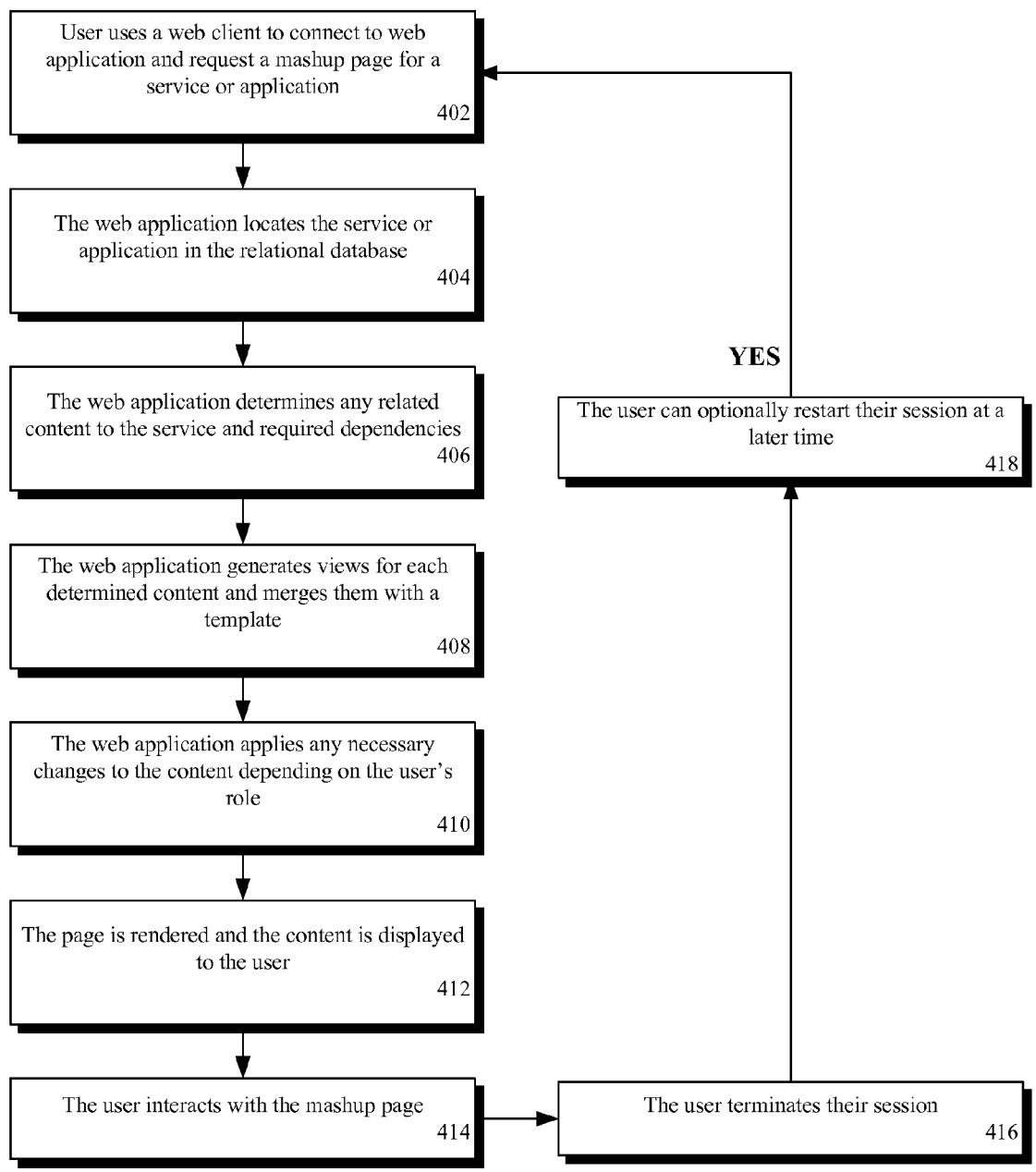
FIG. 4 is a flow chart of a method for using related information to dynamically generate a mashup in accordance with an embodiment of the inventive arrangements disclosed herein.

FIG. 4 is a flow chart of a method 400 for using related information to dynamically generate a mashup in accordance with an embodiment of the inventive arrangements disclosed herein. Method 400 can begin in step 402, where a user can use a web client to connect to a web application and request a mashup for a service or application. In step 404, the web application can locate the service or application in a relational database. In step 406, the web application can determine any related content to the service and any associated required dependencies. In step 408, the web application can generate views for each determine content and merges them with a template. In step 410, the web application can apply any necessary changes to the content depending on the user's role. In some embodiments, changes can be made to reflect the privileges of a user. For example, if a user does not have access to certain content, it can be omitted and not displayed. In some situations, no changes can be made to the content. In step 412, the page can be rendered and the content can be displayed to the user. In step 414, the user can interact with the mashup. In step 416, the user can terminate their session with the web application.

In step 418, the user can optionally restart their session at a later time. If in step 418, the user restarts their session at a later time, method 400 can restart at step 402. In the case that the user returns at a later time, method 400 can determine different content to display in steps 404 through 408. Different content can be determined due to changing relationships in the database. Because the content always changes, the mashup rendered for the user can always be current and correct.

The flowchart and block diagrams in FIG. 4 illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for dynamic mashup creation comprising:

identifying, by a server, a request from a client for a dynamic mashup, the request indicating at least one service;

identifying, by said server, a set of resources associated with the at least one service to be used as a basis for the dynamic mashup;

determining, by the server, a dependency hierarchy of resources for the dynamic mashup, wherein the dependency hierarchy specifies dependency relationships among resources of said set of resources, and wherein the dependency hierarchy is subject to change and is maintained current automatically by a relationship maintenance component of the server without user input ascertaining, by the server, a set of views that correspond to said set of resources;

for each view the server determining a view template that is associated with and is to be applied to that view by the server; and creating, by said server, responsive to determining the dependency hierarchy and the set of views, said dynamic mashup with said views, wherein each of said views is configured in accordance with the associated view template, wherein said dynamic mashup comprises content defined by said set of resources and is configured according to said dependency relationships defined by the dependency hierarchy.

2. The method of claim 1, further comprising:

receiving configuration information from a user associated with the request indicating a role of the user, wherein said configuration information is used by the server to define at least one of the set of resources to be included in the dynamic mashup and at least one of the set of view templates based on the role of the user; and storing the configuration information in a record of a data store that is associated with the user; wherein the stored configuration information is utilized when the dynamic mashup is created to define the view.

3. The method of claim 2, further comprising:

creating said mashup with said views in a user customized manner specified by the stored configuration information associated with the user; and serving the created mashup to at least one remotely located client.

4. The method of claim 1, further comprising:

storing data resulting from user selections made via a mashup creation interface, wherein said stored data defines the set of resources and view templates used to create the dynamic mashup.

5. The method of claim 1, wherein said set of resources are initially defined by an author of said dynamic mashup, wherein said resources and said related resources are maintained in a relational database associated with said server, and wherein said dependency relationships are indicated in said relational database.

6. The method of claim 1, wherein a one-to-one correspondence exists between said resources and said views.

7. The method of claim 1, wherein each of said resources are associated with at least one Uniform Resource Identifier (URI) that defines a source of content for the associated resource, wherein said created dynamic mashup comprises content obtained from a plurality of functionally independent Web sources, each associated with one of the Uniform Resource Identifiers (URIs).

8. A computer program product for dynamic mashup creation, the computer program product comprising:

a non-transitory computer usable medium having computer usable program code embodied therewith, the computer usable program code comprising:

computer usable program code configured to identify, by a server, a request from a client for a dynamic mashup;

computer useable program code configured to identity by said server, a set of resources associated with at least one service to be used as a basis for said dynamic mashup;

computer usable program code configured to cause the server to determine a dependency hierarchy of resources for the dynamic mashup, wherein the dependency hierarchy specifies dependency relationships among resources of said set of resources computer usable program code configured to maintain the dependency hierarchy current in a data store associated with the server, wherein the dependency hierarchy is subject to change and the dependency hierarchy is automatically maintained current without user input;

computer usable program code configured to ascertain a set of views, by the server, that correspond to said set of resources;

computer usable program code configured to determine, by the server, for each view of the set of views a view template that is associated with and is to be applied to that view by the server; and computer usable program code configured to dynamically create, by said server responsive to the determination of the dependency hierarchy and the set of view, said dynamic mashup, which comprises said views, wherein each of said views is configured in accordance with the associated view template, wherein said dynamic mashup comprises content defined by said set of resources and that is configured according to said dependency relationships defined by the dependency hierarchy.

9. The computer program product of claim 8, further comprising:

computer usable program code configured to receive configuration information from a user associated with the request indicating a role of the user, wherein said configuration information is used by the server to define at least one of the set of resources to be included in the dynamic mashup and at least one of the set of view templates based on the role of the user; and computer usable program code configured to store the configuration information in a record of a data store that is associated with the user; wherein the stored configuration information is utilized when the dynamic mashup is created to define the view.

10. The computer program product of claim 9, further comprising:

computer usable program code configured to create said mashup with said views in a user customized manner specified by the stored configuration information associated with the user; and computer usable program code configured to serve the created mashup to at least one remotely located client.

11. The computer program product of claim 8, the computer usable program code further comprising:
computer usable program code configured to store data resulting from user selections made via a mashup creation interface, wherein said stored data defines the set of resources and view templates used to create the dynamic mashup.

12. The computer program product of claim 8, wherein said set of resources are initially defined by an author of said dynamic mashup, wherein said resources and said related resources are maintained in a relational database associated with said server, and wherein said dependency relationships are indicated in said relational database.

13. The computer program product of claim 8, wherein a one-to-one correspondence exists between said resources and said views.

14. The computer program product of claim 8, wherein each of said resources are associated with at least one Uniform Resource Identifier (URI) that defines a source of content for the associated resource, wherein said created dynamic mashup comprises content obtained from a plurality of functionally independent Web sources, each associated with one of the Uniform Resource Identifiers (URIs).

15. A system for creating dynamic mashups comprising:
a relational data store comprising a plurality of resources and resource relationships, wherein each of said resources are associated with at least one Uniform Resource Identifier (URI) that identifies a source of content for the associated resource, wherein said resource relationships define a set of dependencies among the plurality of resources, a plurality of resource groupings each of which define content to be used to generate a corresponding dynamically created mashup and at least one associated service, wherein said resource groupings are user and administrator configurable;
a relationship maintenance component configured to automatically maintain the set of dependencies current, wherein the resource groupings and resource relationships are subject to change and the relationship maintenance component maintains the set of dependencies current without user input;
a request processing component configured to receive requests from clients for dynamically created mashups from remotely located computing devices over a network, each of the requests indicating at least one service associated with at least one of the resource groupings;
a dynamic mashup creation engine configured to dynamically create mashups responsive to said requests received by the request processing component from said clients based on a resource grouping indicated each request, wherein said resource grouping determined by dependencies indicated in said data store among said resources, wherein content of said dynamically created mashups comprises content defined by said resources and said resource relationships associated with the given resource grouping; and
a serving component configured to serve dynamically created mashups generated by the dynamic mashup creation engine to said clients in response to requests received from said clients by the request processing component.

16. The system of claim 15, wherein:
the relationship maintenance component is configured to detect changes made to the source of content for any of the resources of the data store, to determine changes to the resource relationships resulting from the detected changes, and to update the resource relationships of the resource groupings based upon the changes of the resource relationships so that currency of the resource relationships is maintained for the resource groupings.

17. The system of claim 15, wherein said data store further comprises a plurality of user profiles, wherein each of said user profiles specifies user specific and user defined properties to be applied to at least one dynamically created mashup, wherein said request processing component determines a user identity for each received request, and wherein the dynamic mashup creation engine applies the user defined properties of a user profile identified with a user identity determined by the request processing component when dynamically creating said dynamically created mashups.

18. The system of claim 15, wherein said data store further comprises a plurality of user configurable view templates, wherein each of the resource groupings is associated with a set of said user configurable view templates, wherein each of the dynamically created templates comprises a plurality of views, where a one-to-one correspondence exists between said plurality of views and said resources, and wherein said dynamic mashup creation engine applies settings of view templates to each associated view when dynamically creating said dynamically created mashups.

19. The system of claim 15, further comprising:
a mashup editing component configured to provide an interface through which users are able to select any of the resources contained within said data store and to define a new resource grouping based upon user selected resources, wherein said provided interface also permits said users to modify settings of existing resource groupings for which the users are granted editing authorization, wherein said resource groupings of the data store comprise resource groupings created and edited via the mashup editing component.

20. The system of claim 15, wherein at least a portion of said dynamically created mashups comprises content obtained from a plurality of functionally independent Web sources, each associated with one of the Uniform Resource Identifiers (URIs) of the resources associated with the resource groupings of the dynamically created mashups.

* * * * *